United States Patent [19]
Nakanishi

[11] Patent Number: 5,835,754
[45] Date of Patent: Nov. 10, 1998

[54] BRANCH PREDICTION SYSTEM FOR SUPERSCALAR PROCESSOR

[75] Inventor: Chikako Nakanishi, Tokyo, Japan

[73] Assignee: Mitsubishi Denki Kabushiki Kaisha, Tokyo, Japan

[21] Appl. No.: 816,338

[22] Filed: Mar. 13, 1997

[30] Foreign Application Priority Data

Nov. 1, 1996 [JP] Japan .................................. 8-291618

[51] Int. Cl.⁶ ...................................................... G06F 9/42
[52] U.S. Cl. .......................................................... 395/586
[58] Field of Search ..................... 364/DIG. 17 MS File, 364/DIG. 2 MS File; 395/376, 381, 383, 392, 580, 581, 582, 583, 584, 585, 586

[56] References Cited

U.S. PATENT DOCUMENTS 5,414,822   5/1995   Saito et al. .............................. 395/587

FOREIGN PATENT DOCUMENTS 5-158689   6/1993   Japan .
6-110684   4/1994   Japan .

OTHER PUBLICATIONS

J. L. Hennessy et al, "Computer Architecture A Quantitative Approach", pp. 306–315.
B. Calder et al, "Next Cache Line and Set Prediction", pp. 287–296.

*Primary Examiner*—Robert B. Harrell
*Attorney, Agent, or Firm*—Burns, Doane, Swecker & Mathis, LLP

[57] ABSTRACT

Each entry of BTBs (11 and 21) stores branch prediction information on a branch instruction including a 2-bit offset which indicates a location at which the branch instruction is stored in a cache block. The BTBs (11 and 21) simultaneously output the branch prediction informations stored in the entries specified by an index of an executable instruction address in an address fetch unit (1) as the first and second retrieval branch prediction informations, respectively. A selection circuit (2) determines a next program counter value (PC') on the basis of outputs of tag detection circuits (12 and 22), outputs of PC detection circuits (13 and 23), a tag in the address fetch unit (1), a program counter value (PC) and the first and second retrieval branch prediction informations.

7 Claims, 6 Drawing Sheets

BRANCH PREDICTION SYSTEM FOR SUPERSCALAR PROCESSOR

BACKGROUND OF THE INVENTION

1. Field of the Invention

The present invention relates to a branch prediction mechanism for superscalar processor including a branch-target buffer (BTB) for performing a branch prediction of the superscalar processor.

2. Description of the Background Art

In order for a superscalar processor to deliver its full performance, it is necessary to supply sufficient instructions so as not to make an execution unit unassigned.

It is easy to supply the desired number of instructions to a sequential instruction queue, but it is difficult if a branch instruction causes an unseqential instruction fetch. The branch prediction allows proper instruction fetch even if the branch instruction is founded, and therefore is a critical technique in the superscalar processor for higher performance.

The branch prediction refers to prediction of execution result of the branch instruction (whether the branch is taken or not-taken) performed simultaneously with instruction fetch, instead of waiting until whether the branch is taken or not is determined. The branch prediction is implemented with either of hardware and software.

The hardware branch prediction refers to a dynamic branch prediction using a branch-target buffer (BTB) and the like. If the branch prediction is wrong, the processor suffers from a branch delay by correction of a program counter (PC) (referred to as "mispredict penalty"). The superscalar processor, which performs simultaneous fetch of a plurality of instructions into a cache block and parallel execution of the instructions, especially suffers from degradation in performance caused by pipeline stall (cycles while the pipeline stops) and invalidation of wrong instruction more than by mispredict penalty. Therefore, accurate branch prediction is more critical for the superscalar processor.

The BTB refers to a small-capacity memory indexed by a lower bit of an branch instruction address, and stores information as to the latest-executed branch instruction.

FIG. 7 illustrates a configuration of a background-art branch prediction mechanism using a BTB. As shown in FIG. 7, the branch prediction mechanism consists of a BTB 31, a coincidence detection circuit 32, a selection circuit 33 and an address fetch unit 34. The address fetch unit 34 stores 32-bit addresses (upper 25-bit tag+lower 7-bit index).

The BTB 31 has 128 storage regions (entries) each consisting of tag, branch information (BI) and target address (BTA). The branch information refers to information predicting whether the branch is taken or not, and the target address refers to an address used when the branch information indicates that the branch is predicted "taken".

The coincidence detection circuit 32 performs a comparison between one of the tags read out from the BTB 31 and the tag stored in the address fetch unit 34, and outputs a tag detection signal S32 indicating whether these tags coincide or not.

The selection circuit 33 receives the tag detection signal S32, the program counter value PC, one of the branch informations and one of the target addresses read out from the BTB 31, and outputs the target address as a next program counter value PC' if the tag detection signal S32 indicates coincidence and the branch information indicates that the branch is predicted "taken" or otherwise outputs a value obtained by incrementing the program counter value PC as the next program counter value PC'.

Entry of information into the BTB 31 is performed during execution of the branch instruction. When the branch instruction is executed, the machine records information indicating an execution result of the branch instruction, i.e., whether the branch is taken or not taken, into a branch information field of the BTB 31. If the branch is taken, the machine records the target address into a target address field and tag part (upper bits not included in the index) of the branch instruction address into the tag field of the BTB 31, thus completing the entry of information into the BTB 31. In some cases, the entry of information into the BTB 31 is not performed when the branch is not taken. Furthermore, the tag part of the branch instruction address is recorded into the tag field in order to distinguish the current branch instruction from other branch instruction having the same index (lower bits).

In the branch prediction mechanism having this configuration, a retrieval entry is determined by the index value of the address of the branch instruction stored in the address fetch unit 34, and then reference is made to the retrieval entry of the BTB 31. Specifically, the information (tag, branch information and target address) in the retrieval entry is outputted.

The coincidence detection circuit 32 performs a comparison between the tag part of the address of the branch instruction and the tag in the retrieval entry of the BTB 31 which is made reference to, and outputs the tag detection signal S32 indicating the comparison result to the selection circuit 33.

The selection circuit 33 receives the tag detection signal S32, the branch information and the target address in the retrieval entry of the BTB 31 and the program counter value PC, and judges that the branch information and the target address in the retrieval entry are valid if the tag detection signal S32 indicates coincidence.

The selection circuit 33 makes reference to the branch information in the retrieval entry, and outputs the target address in the retrieval entry as the next program counter value PC' if the branch information indicates that the branch is predicted "taken". The next program counter value PC' is an address of an instruction to be subsequently fetched.

If the tag detection signal S32 indicates incoincidence, the branch information on the branch instruction is not found (possible cases are those where the instruction may have never been executed, the instruction may have not been entered as the branch was not taken in execution of the branch instruction, branch information on other branch instruction may have been entered in the entry or the like). In this case, the branch is predicted "not-taken" and a sequential address of instruction which is obtained by incrementing the program counter value PC is outputted as the next program counter value PC'. For reference, the decision logic on the next program counter value PC' is shown in

TABLE 1

| COINCIDENCE OF TAGS TAKEN/NOT-TAKEN | PREDICTION OF TAKEN/NOT-TAKEN | PC' (NEXT PC) |
| --- | --- | --- |
| ○ | ○ | TARGET ADDRESS IN BTB |
| ○ | X | SEQUENTIAL ADDRESS |
| X | don't care | SEQUENTIAL ADDRESS |

Thus, in the background-art BTB 31, one entry is provided per address and one branch prediction is obtained at a time.

In the superscalar processor, since a plurality of instructions are fetched at a time, the address of the branch instruction is not known until the instruction is decoded. For this reason, an access is made to the BTB 31 after decoding the instruction. Furthermore, in an application with frequent occurrence of branch instructions, such as nonscientific computation, there is a strong likelihood that more than one branch instruction may be supplied to a decoder at a time. Since prediction can be made with respect to only one branch at a time, however, restriction is conventionally placed so as not to decode or predict more than one branch instruction.

In general, reference is made to the information stored in the BTB using part of the address (index). In other words, no access can be made to the BTB until the branch instruction is recognized and accordingly reference is made to the information after decoding the instruction.

For this reason, there is a disadvantage that a branch penalty arises even if the prediction that the branch is taken is correct. Specifically, assuming that pipeline stages of two instructions (CM1 and CM2) in the superscalar processor are those as shown in FIG. 8, even if access is made to the BTB at the beginning of a decode stage (ID1) of the branch instruction (CM1), the target address is obtained at the beginning of an instruction issue stage (ID2). Thus, even if the prediction that the branch is taken is correct, the instruction is fetched into the cache block at the beginning of the instruction issue stage of the branch instruction (CM1), disadvantageously causing one-cycle penalty (naturally, the instruction should be fetched at the beginning of the decode stage (ID1)).

On the other hand, the superscalar processor, which fetches one instruction in one cycle, is allowed to make access to the BTB using the address of the fetched instruction simultaneously with the fetch of the instruction. If the instruction is not a branch instruction, as it is not found in the BTB, the branch is predicted to fall through ("not-taken") and the fetch of instruction is continued without any problem.

A branch prediction mechanism which has a BTB with input ports as much as instructions to be fetched into the instruction cache and means for selecting outputs of the BTB would allow access to the BTB in a fetch stage by making simultaneous access to the BTB using the addresses of all the fetched instructions. However, it requires high cost and is not practical as it is rare case that four branch instructions are found in a block.

Since the branch prediction mechanism having the configuration of FIG. 7 can perform a prediction with respect to only one branch instruction in one cycle, for normal operation without any trouble in the superscalar processor, the number of decodable branch instructions in one cycle is restricted to only one, and when a plurality of branch instructions are fetched into the cache block, further restrictions are placed so that a plurality of instructions may be sequentially decoded in a plurality of cycles or the decoder may perform only one branch prediction even if a plurality of branch instructions are fetched into the instruction cache. These restrictions have greatly ill effect on performance of the computer and accuracy of branch prediction by branch prediction mechanism.

SUMMARY OF THE INVENTION

The present invention is directed to a branch prediction mechanism for superscalar processor used in a superscalar processor capable of concurrently fetching a plurality of instructions into an instruction cache in which addresses of the plurality of instructions each consists of tag, index and offset, the plurality of instructions have the same tag and index, and the offset indicates a location at which each of the plurality of instructions is stored in the instruction cache. According to a first aspect of the present invention, the branch prediction mechanism for superscalar processor of the first aspect comprises: instruction address storage means for storing an executable instruction address which includes at least the tag and the index of a program counter value which is an address of a current executable instruction; first to k-th ($k \geq 2$) target buffers each for storing a plurality of branch prediction informations, the plurality of branch prediction informations each including the tag of an address of a branch instruction and an offset corresponding part which corresponds to at least part of the offset of the address, branch information indicating prediction as to whether a branch in execution of the branch instruction is taken or not taken and a target address if the branch information predicts "taken" branch, the first to k-th target buffers outputting first to k-th retrieval branch prediction informations retrieved from the plurality of branch prediction informations on the basis of the index of the executable instruction address, and program counter value output means for judging whether each of the first to k-th retrieval branch prediction informations is valid or invalid according to whether or not the tag of the executable instruction address and that of each of the first to k-th retrieval branch prediction informations coincide and determining a next program counter value to be outputted, which is an address of a branch to be subsequently executed on the basis of one of the first to k-th retrieval branch prediction informations which is judged to be valid.

According to a second aspect of the present invention, in the branch prediction mechanism for superscalar processor of the first aspect, the offset corresponding part is the offset itself, and the program counter value output means takes a result of comparison between the offset of a current program counter value and each of the offsets of the first to k-th retrieval branch prediction informations into consideration to judge whether each of the plurality of branch prediction informations is valid or invalid.

According to a third aspect of the present invention, in the branch prediction mechanism for superscalar processor of the second aspect, when at least two of the first to k-th retrieval branch prediction informations are judged to be valid by the program counter value output means, the program counter value output means determines the next program counter value on the basis of each of the branch informations of the at least two of the first to k-th retrieval branch prediction informations.

According to a fourth aspect of the present invention, in the branch prediction mechanism for superscalar processor of the third aspect, when at least two of the first to k-th retrieval branch prediction informations are judged to be valid by the program counter value output means, the program counter value output means further takes a result of comparison between the offsets of the at least two of the first to k-th retrieval branch prediction informations into consideration to determine the next program counter value.

According to a fifth aspect of the present invention, in the branch prediction mechanism for superscalar processor of the first aspect, the offset consists of first and second partial offsets, the first to k-th target buffers are determined for each storing branch instructions having addresses which are classified according to a predetermined classification rule based on a value of the first partial offset, the offset corresponding part is the second partial offset, and the program counter value output means further takes a result of comparison between the offset of a current program counter value and each of the second partial offsets of the first to k-th retrieval branch prediction informations and the classification rule into consideration to judge whether each of the plurality of branch prediction informations is valid or invalid.

According to a sixth aspect of the present invention, in the branch prediction mechanism for superscalar processor of the fifth aspect, when at least two of the first to k-th retrieval branch prediction informations are judged to be valid by the program counter value output means, the program counter value output means determines the next program counter value on the basis of each of the branch informations of the at least two of the first to k-th retrieval branch prediction informations.

According to a seventh aspect of the present invention, in the branch prediction mechanism for superscalar processor of the sixth aspect, the order of precedence of the first to k-th retrieval branch prediction informations is predetermined according to the classification rule, and the program counter value output means further takes the order of precedence into consideration to determine the next program counter value when at least two of the first to k-th retrieval branch prediction informations are judged to be valid by the program counter value output means.

In the branch prediction mechanism for superscalar processor of the first aspect, the first to k-th (k≧2) target buffers output the first to k-th retrieval branch prediction informations each retrieved from a plurality of branch informations in each target buffer by the index of the executable instruction address.

Therefore, the first to k-th target buffers can output the first to k-th retrieval branch prediction informations simultaneously with instruction fetch into the instruction cache at the time when the index of the executable instruction address is determined. Thus, earlier start of the branch prediction allows reduction in the number of branch penalties.

The program counter value output means determines the next program counter value to be outputted on the basis of one of the first to k-th retrieval branch prediction informations which is judged to be valid.

Therefore, if a plurality of branch instructions are fetched in the instruction cache, only if the number of branch instructions is not more than k, a plurality of branch prediction informations on the branch instructions are simultaneously outputted as the first to k-th retrieval branch prediction informations, thereby ensuring a reliable accuracy of branch prediction with reduction in the number of branch penalties.

In the branch prediction mechanism for superscalar processor of the second aspect, the program counter value output means takes the result of comparison between the offset of the current program counter value and each of the offsets of the first to k-th retrieval branch prediction informations into consideration to judge whether a plurality of branch prediction informations are each valid or invalid.

The judgment on the comparison result invalidates any of the first to k-th retrieval branch prediction informations on the branch instruction having an address less than the program counter value, i.e., inexecutable branch instruction, thereby improving the accuracy of branch prediction.

In the branch prediction mechanism for superscalar processor of the third aspect, when at least two of the first to k-th retrieval branch prediction informations are judged to be valid by the program counter value output means, the program counter value output means determines the respective next program counter values based on the branch informations of the at least two retrieval branch prediction informations.

Of the at least two retrieval branch prediction informations, one which includes the branch information indicating "taken" branch has priority to be adopted as the information on which the next program counter value is determined. That causes further improvement in accuracy of the branch prediction.

In the branch prediction mechanism for superscalar processor of the fourth aspect, the program counter value output means further taken the result of comparison between the offsets of the at least two retrieval branch prediction informations into consideration to determine the next program counter value.

Thus, on the first condition that the branch information indicates "taken" branch and the second condition that the offset value is the least, one of the above at least two retrieval branch prediction informations which satisfies the first and second conditions is adopted as information on which the next program counter value is determined. That ensures further improvement in accuracy of the branch prediction.

In the branch prediction mechanism for superscalar processor of the fifth aspect, the first to k-th target buffers are determined for each storing branch instructions having addresses which are classified according to a predetermined classification rule on the basis of a value of the first partial offset and the program counter value output means further takes the result of comparison between the offset of a current program counter value and each of the second partial offsets of the first to k-th retrieval branch prediction informations and the classification rule into consideration to judge whether the plurality of branch prediction informations are each valid or invalid.

The program counter value output means can invalidates any of the first to k-th retrieval branch prediction informations on the branch instruction having an address less than the program counter value, i.e., inexecutable branch instruction, thereby improving the accuracy of branch prediction.

Storing the second partial offset which is part of the offset, the first to k-th target buffers each need a smaller storage capacity to store a plurality of branch prediction informations than storing the offset itself.

In the branch prediction mechanism for superscalar processor of the sixth aspect, when at least two of the first to k-th retrieval branch prediction informations are judged to be valid by the program counter value output means, the program counter value output means determines the respective next program counter values based on the branch informations of the at least two retrieval branch prediction informations.

Of the at least two retrieval branch prediction informations, one which includes the branch information indicating "taken" branch has priority to be adopted as the information on which the next program counter value is determined. That causes further improvement in accuracy of the branch prediction.

In the branch prediction mechanism for superscalar processor of the seventh aspect, the order of precedence of the first to k-th retrieval branch prediction informations is predetermined according to the classification rule, and the program counter value output means further takes the precedence into consideration to determine the next program counter value when the at least two of the first to k-th retrieval branch prediction informations are judged to be valid by the program counter value output means.

Thus, one of the above at least two retrieval branch prediction informations which has the branch information indicating "taken" branch and has the highest priority is adopted as information on which the next program counter value is determined. That ensures further improvement in accuracy of the branch prediction.

Moreover, predetermining the precedence avoids complication in the configuration of the program counter value output means which would be caused by consideration of the precedence.

An object of the present invention is to provide a branch prediction mechanism for superscalar processor which attains reduction in the number of branch penalties with high accuracy of branch prediction.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Basic Configuration

Figure 1:
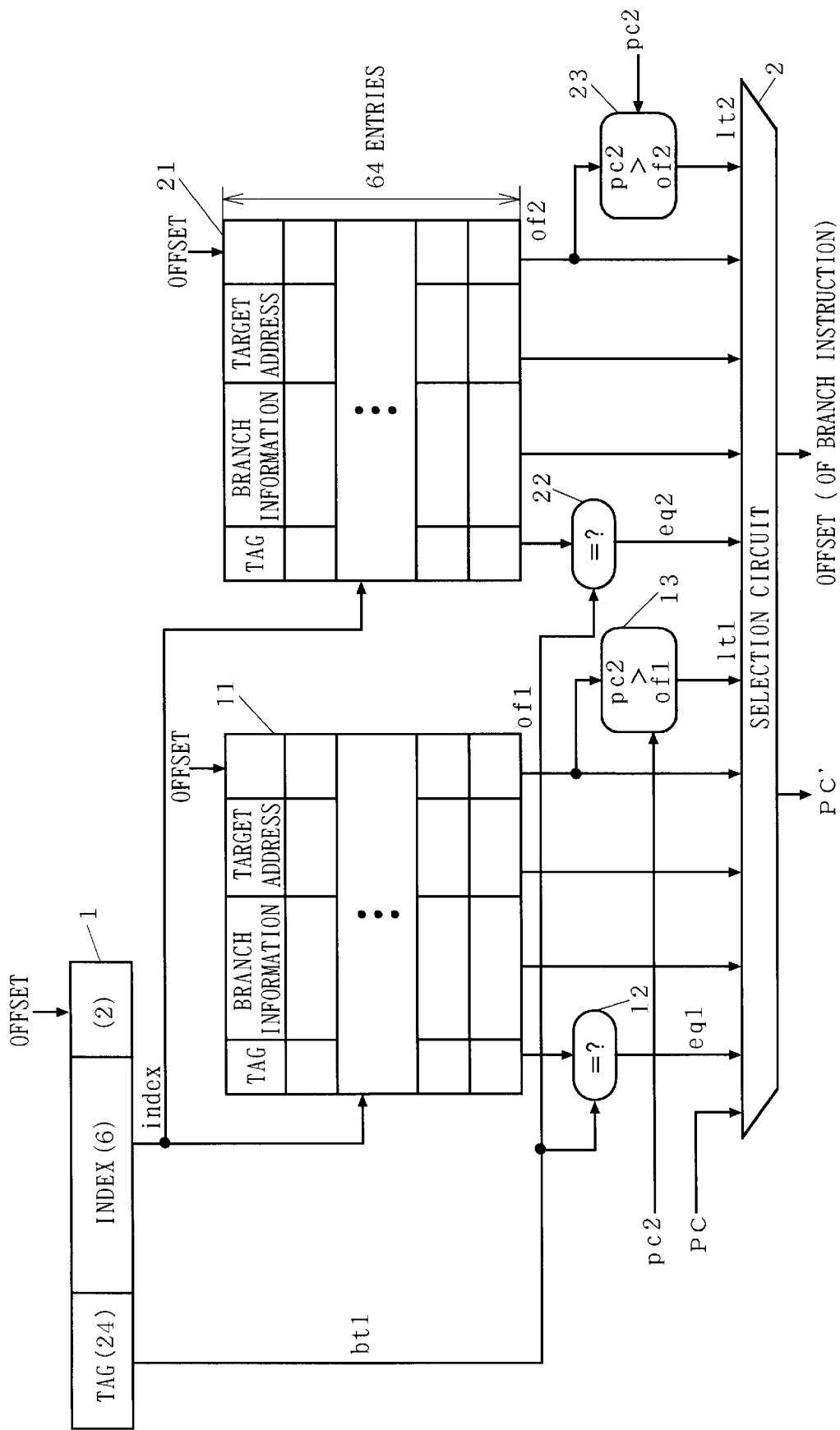
FIG. 1 illustrates a configuration of a branch prediction mechanism in accordance with a first preferred embodiment of the present invention.

FIG. 1 illustrates an exemplary configuration of a BTB used in a branch prediction mechanism for superscalar processor in accordance with the first preferred embodiment of the present invention. The branch prediction mechanism is assumed to be used in a superscalar processor which has a cache block of four instructions using an address of 32-bit length. The cache block refers to a set of instructions fetched at a time into an instruction cache serving as an instruction fetch unit of the superscalar processor. For example, when four instructions are fetched into the instruction cache at a time, these four instructions are called a cache block and the cache block has a size of four.

As illustrated in FIG. 1, the BTB consists of the first BTB 11 and the second BTB 21 each having 64 entries, and it totally has 128 entries as a storage region. Each entry stores branch prediction information on one branch instruction. Accordingly, the branch prediction mechanism of the first preferred embodiment has associativity of two.

In the branch prediction mechanism of the first preferred embodiment, the BTBs 11 and 21 are accessed by an address of the cache block which are used to access the instruction cache. When the cache block has the size of four, an address with lower two bits masked (tag+index) works as the address of the cache block. Thus, in the branch prediction mechanism of the first preferred embodiment, the BTB is accessed by the address with lower two bits masked.

A 32-bit executable instruction address is fetched into an address fetch unit 1. The address fetch unit 1 stores the upper 24 bits of the address as tag, the center 6 bits as index and the lower 2 bits as offset. Accordingly, an address represented by (tag+index) serves as the address of the cache block.

Each of the BTBs 11 and 21 consists of tag, branch information (BI), target address (BTA) and 2-bit offset indicating a location at which the branch instruction is stored in the cache block. A tag field stores the upper 24 bits of the address of the cache block which are not included in the index.

The first BTB 11 uses an entry specified by the index of the executable instruction address in the address fetch unit 1 as a retrieval entry, and outputs the branch prediction information stored in the retrieval entry as the first retrieval branch prediction information.

The second BTB 21 uses an entry specified by the index of the executable instruction address in the address fetch unit 1 as a retrieval entry, and outputs the branch prediction information stored in the retrieval entry as the second retrieval branch prediction information.

A tag detection circuit 12 performs a comparison between the tag of the first retrieval branch prediction information and the tag stored in the address fetch unit 1, and outputs a tag detection signal eq1 indicating whether (the branch information of) the first retrieval branch prediction information is valid or invalid according to whether or not the comparison result is coincidence to a selection circuit 2.

A tag detection circuit 22 performs a comparison between the tag of the second retrieval branch prediction information and the tag stored in the address fetch unit 1, and outputs a tag detection signal eq2 indicating whether the second retrieval branch prediction information is valid or invalid according to whether or not the comparison result is coincidence to the selection circuit 2.

A PC detection circuit 13 outputs a PC detection signal lt1 indicating whether the first retrieval branch prediction information is valid or invalid on the basis of the offset of1 of the first retrieval branch prediction information and the lower 2-bit value pc2 of the program counter value PC.

A PC detection circuit 23 outputs a PC detection signal lt2 indicating whether the second retrieval branch prediction information is valid or invalid on the basis of the offset of2 of the second retrieval branch prediction information and the lower 2-bit value pc2 of the program counter value PC.

Receiving the tag detection signals eq1 and eq2, the PC detection signals lt1 and lt2, the program counter value PC, the offsets of1 and of2, and the branch informations and the target addresses of the first and second retrieval branch prediction informations, the selection circuit 2 determines the next program counter value PC' and outputs it in the following manner. When any of the first and second retrieval branch prediction informations is indicated to be valid by the corresponding tag detection signal eq1 (or eq2) and PC detection signal lt1 (or lt2) and the branch information of that valid retrieval branch prediction information indicates that the branch is taken, the selection circuit 2 outputs the target address as the next program counter value PC' or otherwise outputs a sequential address obtained by incrementing the program counter value PC as the next program counter value PC'. Further, when the branch is predicted "taken", the selection circuit 2 outputs the offset of the address of the branch instruction separately. This offset is used for entry to a list of a branch prediction result storage 4 discussed later.

The branch prediction mechanism of the first preferred embodiment determines the retrieval entry by the index value of the executable instruction address stored in the address fetch unit 1 and outputs the retrieval branch prediction informations (tag, branch information, target address and offset) with reference to the respective retrieval entries of the BTBs 11 and 21.

In a memory, generally, a replacement algorism works so that informations at the retrieval entries specified by one index may not have the same tag. In the first preferred embodiment, however, respective informations at the same retrieval entry in the BTBs 11 and 21 are allowed to have the same tag.

Therefore, in the branch prediction mechanism having associativity of two of the first preferred embodiment, the respective informations on a plurality of branch instructions of which the addresses of the cache block have the same tag, other than the offsets, i.e., two branch instructions which are fetched into the instruction cache at a time, can be separately stored into the BTBs 11 and 21.

Entry of informations to the BTBs 11 and 21 is performed while the branch instruction is executed, like the background art. The entry items are the tag and offset obtained from the address of the branch instruction, the branch information and the target address.

The information is entered in an entry specified by the index of the address of the branch instruction in either of the BTBs 11 and 21. If the information on the executed branch instruction is found (has been already entered) in the entry, the information found in the entry is updated, as discussed later. Determination as to which of the BTBs 11 and 21 is used for entry can be made using any algorism when the information on the executed branch instruction is not found (has been entered yet) in the entry, so no particular specification as to algorism is herein made. The branch information is entered or updated according to whether the branch is taken or not taken. When the branch is taken, the target address of the branch instruction is also entered. Since the address of the branch instruction consists of three fields, i.e., tag, index and offset, there may be a case where the BTBs 11 and 21 have the same entry storing the same tag.

Operation

An operation of the branch prediction mechanism of the first preferred embodiment in an access to the BTBs 11 and 21 will be discussed using an example.

Figure 2:
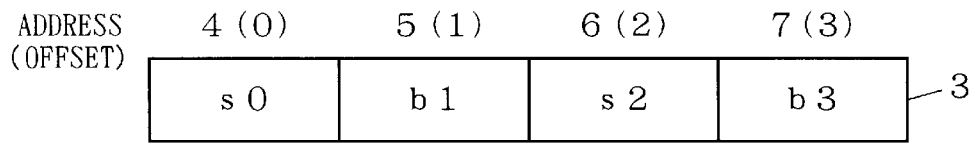
FIG. 2 illustrates a configuration of a cache block discussed in association with an operation of the branch prediction mechanism in accordance with the first preferred embodiment of the present invention.

The current program counter value is herein assumed 4("100"). In this case, the address of the cache block is "4", and the tag part is "0" and the index is "1". FIG. 2 illustrates an exemplary configuration of the cache block.

In FIG. 2, the cache block includes an instruction s0 at an address "4" and an instruction s2 at an address "6" which are arithmetic instructions and an instruction b1 at an address "5" and an instruction b3 at an address "7" which are branch instructions. Since the cache block has a size of four, as shown in FIG. 2, the lower 2-bit value of each address serves as an offset. The respective offsets of the instructions s0, b1, s2 and b3 are 0(00), 1(01), 2(10) and 3(11).

In the first preferred embodiment, the BTBs 11 and 21 are accessed by the address of the cache block simultaneously with fetch of a plurality of instructions into the instruction cache. In this case, the index and the tag of the executable instruction address stored in the address fetch unit 1 are "4" and "0", respectively. The retrieval entry is determined by the index of "4", and the first and second retrieval branch prediction informations (tag, branch information, target address and offset) at the retrieval entry of the BTBs 11 and 21 are outputted.

When the first and second retrieval branch prediction informations are outputted from the BTBs 11 and 21 respectively, the tag detection circuit 12 outputs the tag detection signal eq1 indicating whether the first retrieval branch prediction information is valid or invalid based on whether or not the result of comparison between the tag of the first retrieval branch prediction information and the tag bt1 stored in the address fetch unit 1 is coincidence to the selection circuit 2, and similarly the tag detection circuit 22 outputs the tag detection signal eq2 indicating whether the second retrieval branch prediction information is valid or invalid based on whether or not the result of comparison between the tag of the second retrieval branch prediction information and the tag bt1 stored in the address fetch unit 1 is coincidence to the selection circuit 2.

At the same time, the PC detection circuit 13 performs a comparison between the lower 2-bit value pc2 of the program counter value PC and the offset of1 of the first retrieval branch prediction information, and outputs the PC detection signal lt1 indicating that the information is valid when of1≧pc2 or otherwise outputs the PC detection signal lt1 indicating that the information is invalid to the selection circuit 2. Similarly, the PC detection circuit 23 performs a comparison between the lower 2-bit value pc2 of the program counter value PC and the offset of2 of the second retrieval branch prediction information, and outputs the PC detection signal lt2 indicating that the information is valid when of2≧pc2 or otherwise outputs the PC detection signal lt2 indicating that the information is invalid to the selection circuit 2.

The selection circuit 2 outputs the next program counter value PC', according to the logic of Table 2, on the basis of the tag detections signals eq1 and eq2 and the PC detection signals lt1 and lt2, and the branch informations and the target addresses of the first and second retrieval branch prediction informations.

TABLE 2

| BRANCH IN BTB 11 TAKEN/NOT-TAKEN | BRANCH IN BTB 21 TAKEN/NOT-TAKEN | of1 < of2 | PC' (NEXT PC) |
|---|---|---|---|
| ○ | ○ | ○ | TARGET ADDRESS IN BTB 11 |
| ○ | ○ | X | TARGET ADDRESS IN BTB 21 |
| ○ | X | don't care | TARGET ADDRESS IN BTB 11 |
| X | ○ | don't care | TARGET ADDRESS IN BTB 21 |
| X | X | don't care | SEQUENTIAL ADDRESS |

In Table 2, "taken"(○) on the column of the first BTB 11 is found when both the tag detection signal eq1 and the PC detection signal lt1 indicate that the information is valid and the branch information of the first retrieval branch prediction information indicates "taken" branch and otherwise "not-taken"(X) is found. Similarly, "taken"(○) on the column of the second BTB 21 is found when both the tag detection signal eq2 and the PC detection signal lt2 indicate that the information is valid and the branch information of the second retrieval branch prediction information indicates "taken" branch and otherwise "not-taken"(X) is found.

As can been seen from the first and second rows of Table 2, the selection circuit 2 performs a comparison between the offset of1 and the offset of2 when "taken" is found in both the columns of the first and second BTBs 11 and 21, and outputs the target address of the first retrieval branch prediction information as the next program counter value PC' when of1<of2 and outputs the target address of the second retrieval branch prediction information as the next program counter value PC' when of1>of2.

As can been seen from the third and fourth rows of Table 2, the selection circuit 2 outputs the target address of the first BTB 11 as the next program counter value PC' when the branch in the first BTB 11 is predicted "taken" and outputs the target address of the second BTB 21 as the next program counter value PC' when the branch in the second BTB 21 is predicted "taken".

As can been seen from the last row of Table 2, the selection circuit 2 outputs the sequential address obtained by incrementing the program counter value PC as the next program counter value PC' when both the branches in the first and second BTBs 11 and 21 are predicted "not-taken".

Figure 3:
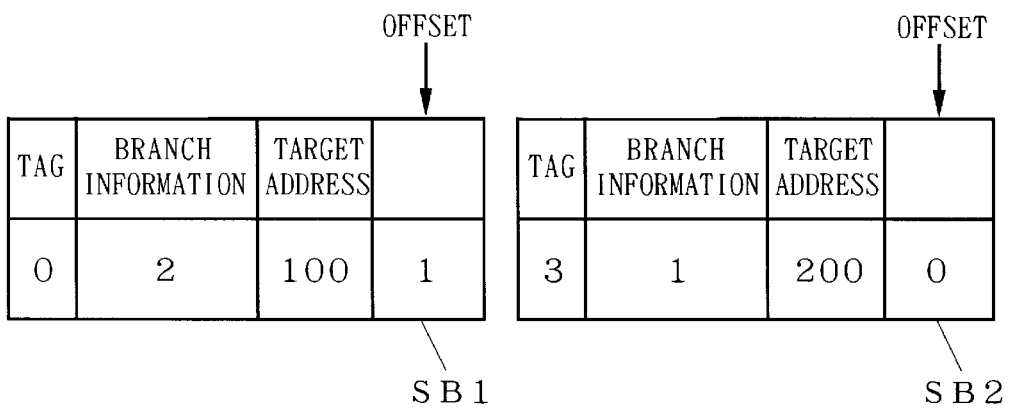
FIG. 3 illustrates an example of retrieval entry selected by an index discussed in association with the operation of the branch prediction mechanism in accordance with the first preferred embodiment of the present invention.

For example, herein discussed will be an operation in a case where the first and second retrieval branch prediction informations in the first and second BTBs 11 and 21 are those shown in FIG. 3. In this example, it is assumed that the branch is predicted "taken" when the branch information indicates "2" and more.

In this case, the tag bt1 stored in the address fetch unit 1 and the tag of the first retrieval branch prediction information SB1 coincide being "0". Further, the offset of1 of the first retrieval branch prediction information SB1 is "1" (that is, the first retrieval branch prediction information SB1 holds the information on the branch instruction b1) and the lower 2-bit value pc2 of the current program counter value PC is "0", and thus the relation of1≧pc2 is established.

Accordingly, since both the tag detection signal eq1 and the PC detection signal lt1 indicate that the information is valid and the selection circuit 2 judges whether the branch in the first BTB 11 is taken or not-taken on the basis of the branch information of the first retrieval branch prediction information SB1.

On the other hand, the tag of the second retrieval branch prediction information SB2 is "3" and does not coincides with the tag bt1, and the tag detection signal eq2 indicates that the information is invalid.

Accordingly, since the second retrieval branch prediction information SB2 does not hold the information on the instruction in the cache block of the instruction cache, the selection circuit 2 judges that the branch in the second BTB 21 is not taken.

As a result, since the branch in the first BTB 11 is judged "taken" on the basis of the branch information of the first retrieval branch prediction information SB1 of "2" indicating "taken" branch, the selection circuit 2 outputs the target address of the first retrieval branch prediction information SB1 as the next program counter value PC' according to the logic of Table 2. Consequently, the superscalar processor fetches four instructions into the instruction cache at a time using the cache-block address of the next program counter value PC'.

When the branch information of the first retrieval branch prediction information SB1 is "1" or less indicating "not-taken" branch, judging that the branch in the first BTB 11 is not taken, the selection circuit 2 outputs the sequential address obtained by incrementing the program counter value PC as the next program counter value PC'.

Figure 4:
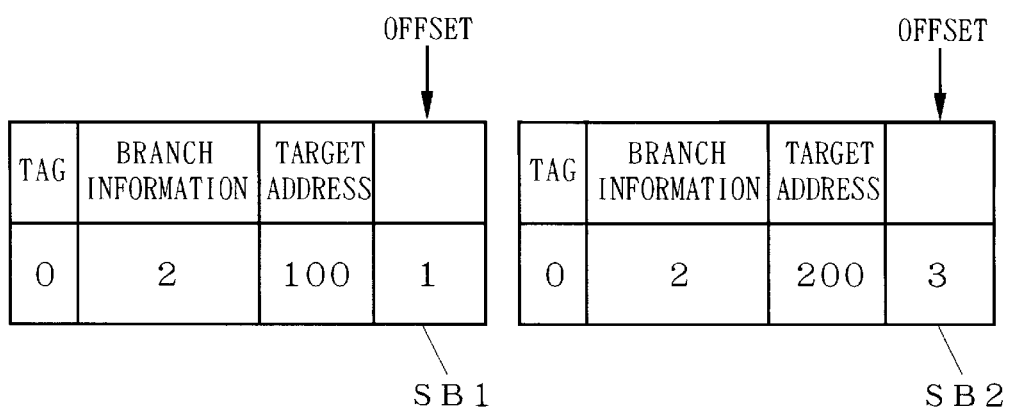
FIG. 4 illustrates another example of retrieval entry selected by an index discussed in association with the operation of the branch prediction mechanism in accordance with the first preferred embodiment of the present invention.

As another example, herein discussed will be an operation in a case where the first and second retrieval branch prediction informations in the first and second BTBs 11 and 21 are those shown in FIG. 4.

In this case, the tag bt1 ("0") stored in the address fetch unit 1 and the tags ("0") of the first and second retrieval branch prediction informations SB1 and SB2 coincide. That is, the informations on two branch instructions stored in the cache block of the instruction cache are held in the first and second retrieval branch prediction informations SB1 and SB2, respectively.

Since the offset of1 of the first retrieval branch prediction information SB1 is "1", the information on the branch instruction by is found in the first retrieval branch prediction information SB1. Since the offset of2 of the second retrieval branch prediction information SB2 is "3", the information on the branch instruction b3 is found in the second retrieval branch prediction information SB2. Further, each of the offsets of1 and of2 is larger than the lower 2-bit value pc2 of the program counter value PC of "0".

Thus, since both the tag detection signal eq1 and the PC detection signal lt1 indicate that the information is valid and both the tag detection signal eq2 and the PC detection signal lt2 indicate that the information is valid, the selection circuit 2 judges whether the branches are taken or not taken on the basis of the respective branch prediction results in the first and second BTBs 11 and 21.

Since both the branch informations of the first retrieval branch prediction information SB1 and the second retrieval branch prediction information SB2 are each "2" indicating "taken" branch, the selection circuit 2 performs a comparison between the offset of1 of the first retrieval branch prediction information SB1 and the offset of2 of the second retrieval branch prediction information SB2 according to the first and second rows of Table 2.

As the comparison result is of1 ("1")<of2 ("3"), the selection circuit 2 recognizes that the branch instruction b1 associated with the first retrieval branch prediction information SB1 is executed prior to the branch instruction b2 associated with the second retrieval branch prediction information SB2 and outputs the target address of the first retrieval branch prediction information SB1 in the first BTB 11 as the next program counter value PC'.

As discussed above, the selection circuit 2 takes the PC detection signals lt1 and lt2 into consideration to determine whether the respective branches in the BTBs 11 and 21 are taken or not. The reason will be discussed below.

For example, there may be a case where the instruction at the address "6" (instruction s2 of FIG. 2) is a target of other branch instruction. In this case, the current program counter value PC is "6" and on the other hand, the address of the cache block is "4".

In the branch prediction mechanism of the first preferred embodiment, the BTBs 11 and 21 are accessed using the address "4" of the cache block. When the instruction b1 at the address "5" is a branch instruction in the cache block as shown in FIG. 2 and the branch prediction information on the branch instruction b1 is found in the first retrieval branch prediction information SB1 as shown in FIGS. 3 and 4, if the branch information of the first retrieval branch prediction information SB1 indicates "taken" branch, there is a possibility that its target address may be selected as the next program counter value PC' though the branch instruction by having the address value less than the program counter value PC is naturally inexecutable.

To avoid that, the selection circuit 2 takes the PC detection signal lt1 indicating the result of comparison between the lower 2-bit value pc2 of the program counter value PC and the offset of1 of the first retrieval branch prediction information SB1 into consideration to determine whether the branch is taken or not taken.

In this case, since the lower 2-bit value pc2 is "2" and the offset of1 is "1", the relation of1<pc2 is established. As a result, the selection circuit 2 recognizes that the branch instruction associated with the first retrieval branch prediction information SB1 is an inexecutable branch instruction and obtains a prediction result that the branch in the BTB 11 is "not-taken". That eliminates the possibility of selecting a wrong target address as the next program counter value PC', to achieve improvement in accuracy of branch prediction.

Figure 5:
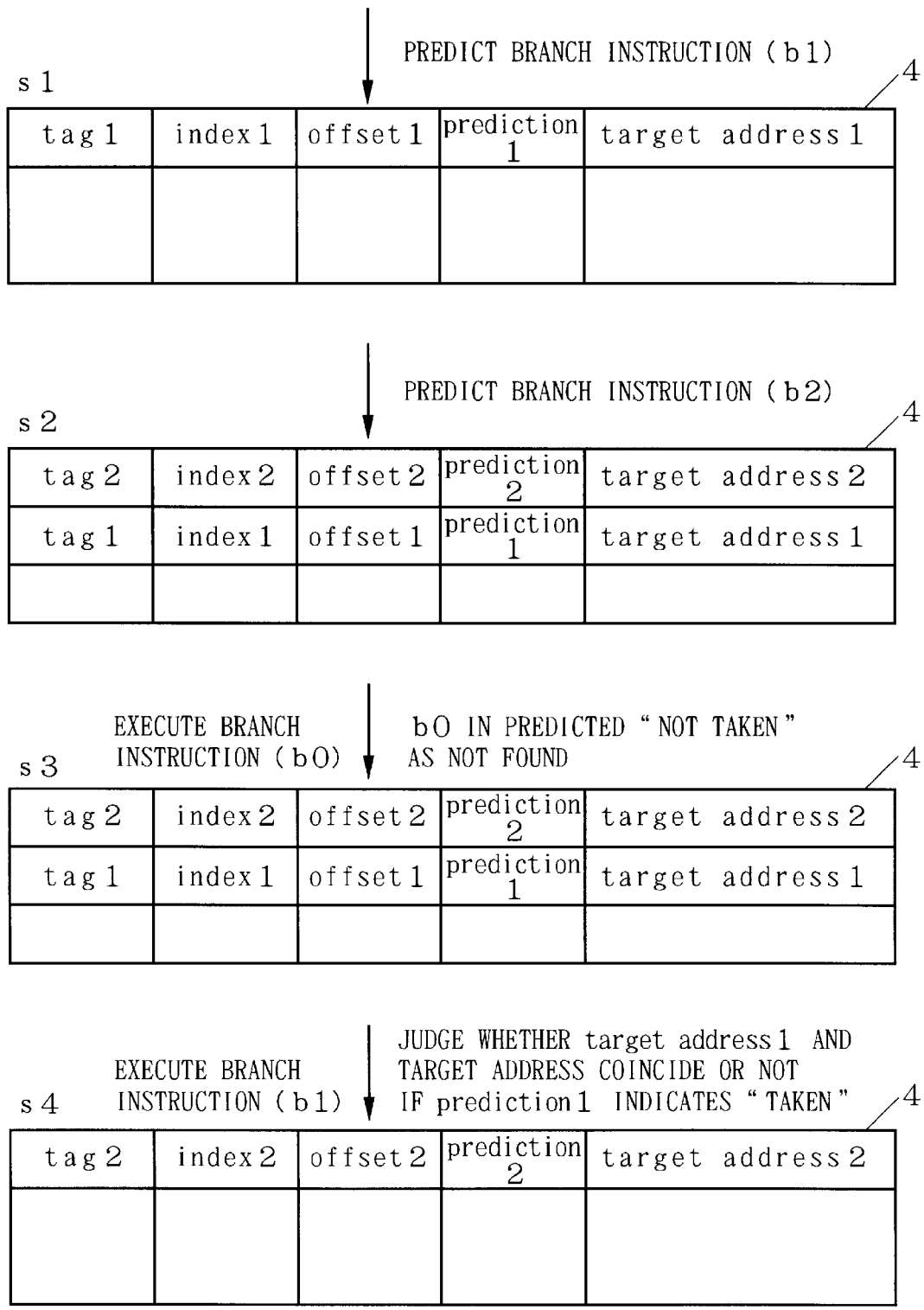
FIG. 5 illustrates an outline of a branch prediction result storage for storing a branch prediction result.

Check on Whether Branch Prediction is Correct or Wrong and Entry of Information to BTB The superscalar processor includes a branch prediction result storage 4 storing a list of branch predictions in order as performed on the branch instructions using the BTB, as shown in FIG. 5, to check whether each of the branch predictions is correct or wrong.

The list of the branch prediction result storage 4 is implemented using an FIFO (First-In First-Out) buffer. Entries of the list each store an address (consisting of tag, index, offset of the cache block), prediction result and target address to be used if the branch is predicted "taken" with respect to a branch instruction.

A branch instruction which has no entry in the list has not been entered in the BTB. This means that the branch is predicted "not-taken". A branch which is found in the BTB and is predicted "not-taken" is entered in the list of the branch prediction result storage 4 with incorrect target address.

The superscalar processor executes branch instructions according to a program. The branch instruction is detected by decoding the instruction independently of the branch prediction mechanism of the first preferred embodiment. After execution of the branch instruction, the superscalar processor performs a comparison between the information on the branch and the information of the list in the branch prediction result storage 4. For correct prediction, the following conditions 1) and 2) should be satisfied.

1) If a branch instruction is executed and the branch is taken, its address should coincide with an address of one of branch instructions in the list of the branch prediction result storage 4. If these addresses do not coincide, the branch was predicted "not-taken" (the branch instruction has not been entered in the BTB).

2) If the address of an executed branch instruction coincides with an address of one of branch instructions in the list of the branch prediction result storage 4, the predicted branch direction (execution result, i.e., "taken" or "not-taken") and the branch direction obtained by executing the branch instruction should coincide with each other and if the branch is taken, the predicted target address and the target address obtained by executing the branch instruction should coincide, too. By comparing these target addresses, a check as to whether the prediction of an indirect branch is correct or wrong (the target address of the indirect branch may change during execution).

If neither of the above two conditions is satisfied, the branch prediction is wrong. If the condition 1) is not satisfied, the information (tag, branch information, target address and offset) on the executed branch instruction is entered in the entry indexed by the address of the branch instruction of either the BTB 11 or 21.

On the other hand, if the condition 2) is not satisfied, the content in an entry storing the information on the branch instruction in one of the BTBs 11 and 21 which is accessed is updated. The target address is updated only when the branch is taken.

Further, if one of the BTBs 11 and 21 stores the information on the executed branch instruction, the branch information is updated regardless of whether the conditions are satisfied or not.

Referring to FIG. 5, change in the list of the branch prediction result storage 4 will be discussed. In the step s1, when the branch prediction mechanism of the first preferred embodiment predicts that the branch is taken in execution of the branch instruction b1, the address (tag1, index1 and offset1) and prediction result (prediction1 (branch direction) and target address1) with respect to the branch instruction b1 are entered in the list of the branch prediction result storage 4.

In the step s2, when the branch prediction mechanism of the first preferred embodiment predicts that the branch is taken in execution of the branch instruction b2, the address (tag2, index2 and offset2) and prediction result (prediction2 and target address2) with respect to the branch instruction b2 are entered in the list of the branch prediction result storage 4.

In the step s3, when the superscalar processor executes a branch instruction b0, the superscalar processor judges that the branch is predicted "not taken" as the information on the branch instruction b0 is not found in the BTB 11 or 21, and enters information (tag, branch information, target address and offset) on the branch instruction b0 in an entry indexed by the address of the branch instruction.

In the step s4, when the superscalar processor executes the branch instruction b1, the superscalar processor deletes the address (tag1, index1 and offset1) and prediction result (prediction1 and target address1) with respect to the branch instruction b1 from the list of the branch prediction result storage 4 and then performs a comparison between the actual target address of the branch instruction b1 and the target address1.

If these target addresses coincide, the branch information in the entry storing the information on the branch instruction in one of the BTBs 11 and 21 which is accessed is updated so as to heighten prediction accuracy. If these target addresses do not coincide, the branch information in the entry storing the information on the branch instruction in one of the BTBs 11 and 21 which is accessed is updated so as to lower prediction accuracy. Or, the actual target address is changed to a target address for another prediction.

Effect

As discussed above, the branch prediction mechanism of the first preferred embodiment includes two BTBs 11 and 21 of which the entries can be accessed by the index of the executable instruction address fetched in the address fetch unit 1, and each entry of the BTBs 11 and 21 stores the offset indicating the location at which the instruction is stored in the cache block. That enables branch prediction only by fetching the executable instruction address into the address fetch unit 1, without decoding.

Therefore, in the branch prediction mechanism of the first preferred embodiment, no penalty is caused only if the prediction is correct when the branch is taken. Moreover, a plurality of BTBs 11 and 21 are provided for an index of an executable instruction address in the address fetch unit 1, which are allowed to have the same tag, to perform the respective branch predictions of two branch instructions if found in the cache block without delay. As a result, the branch prediction mechanism of the first preferred embodiment attains remarkable reduction in the number of branch penalties.

Furthermore, the configuration of the first preferred embodiment is achieved with relatively little increase of circuits: the offset field in the BTB, another BTB and the PC detection circuits 13 and 23. That does not cause a rise in cost.

The selection circuit 2 takes the PC detection signals lt1 and lt2 which are the results of comparison between the lower 2-bit value pc2 of the current PC program counter PC and the respective offsets of the first and second retrieval branch prediction informations into consideration to determine the next PC program counter value PC. That allows invalidation of any retrieval branch prediction information on an inexecutable branch instruction, resulting in higher accuracy of branch prediction.

Further, even when both the first and second retrieval branch prediction informations are judged to be valid by the selection circuit 2, the selection circuit 2 gives priority to the target address corresponding to the branch information indicating "taken" branch to be used as the next program counter value PC' on the basis of the respective branch informations of the first and second retrieval branch prediction informations according to the logic of Table 2. That ensures further improvement in accuracy of branch prediction.

Furthermore, if both the first and second retrieval branch prediction informations are judged to be valid and both the branch informations thereof indicate "taken" branch, the selection circuit 2 gives priority to the target address of the branch instruction which will be executed ahead to be used as the next program counter value PC' on the comparison between the respective offsets of the first and second retrieval branch prediction informations according to the logic of Table 2. That ensures still further improvement in accuracy of branch prediction.

The configuration of the first preferred embodiment includes two BTBs and allows two retrieval branch prediction informations to be simultaneously outputted. The number of BTBs is not restricted to two, however, the configuration may include more than two BTBs and allows more than two retrieval branch prediction informations to be simultaneously outputted.

The Second Preferred Embodiment

Figure 6:
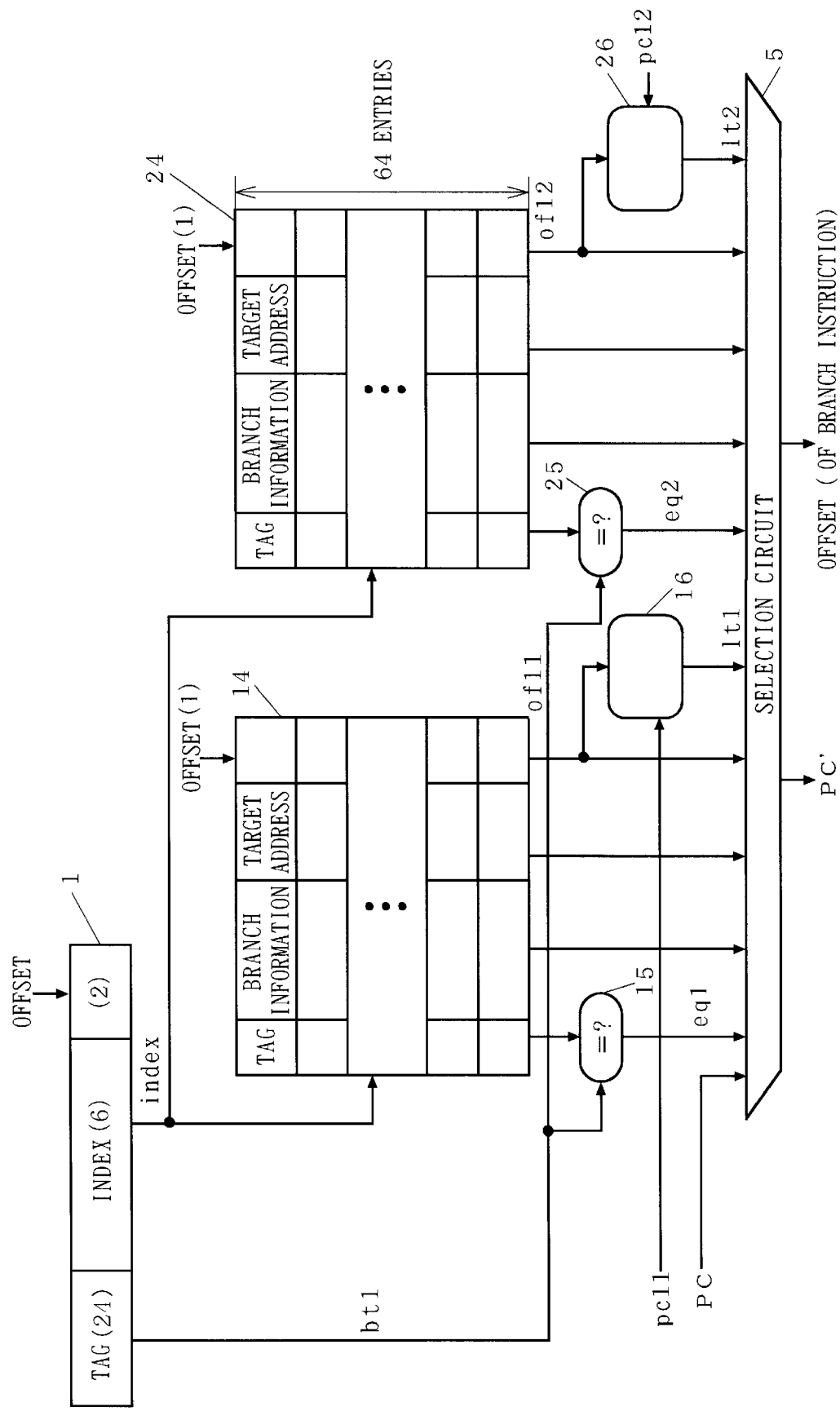
FIG. 6 illustrates a configuration of a branch prediction mechanism in accordance with a second preferred embodiment of the present invention.
Figure 7:
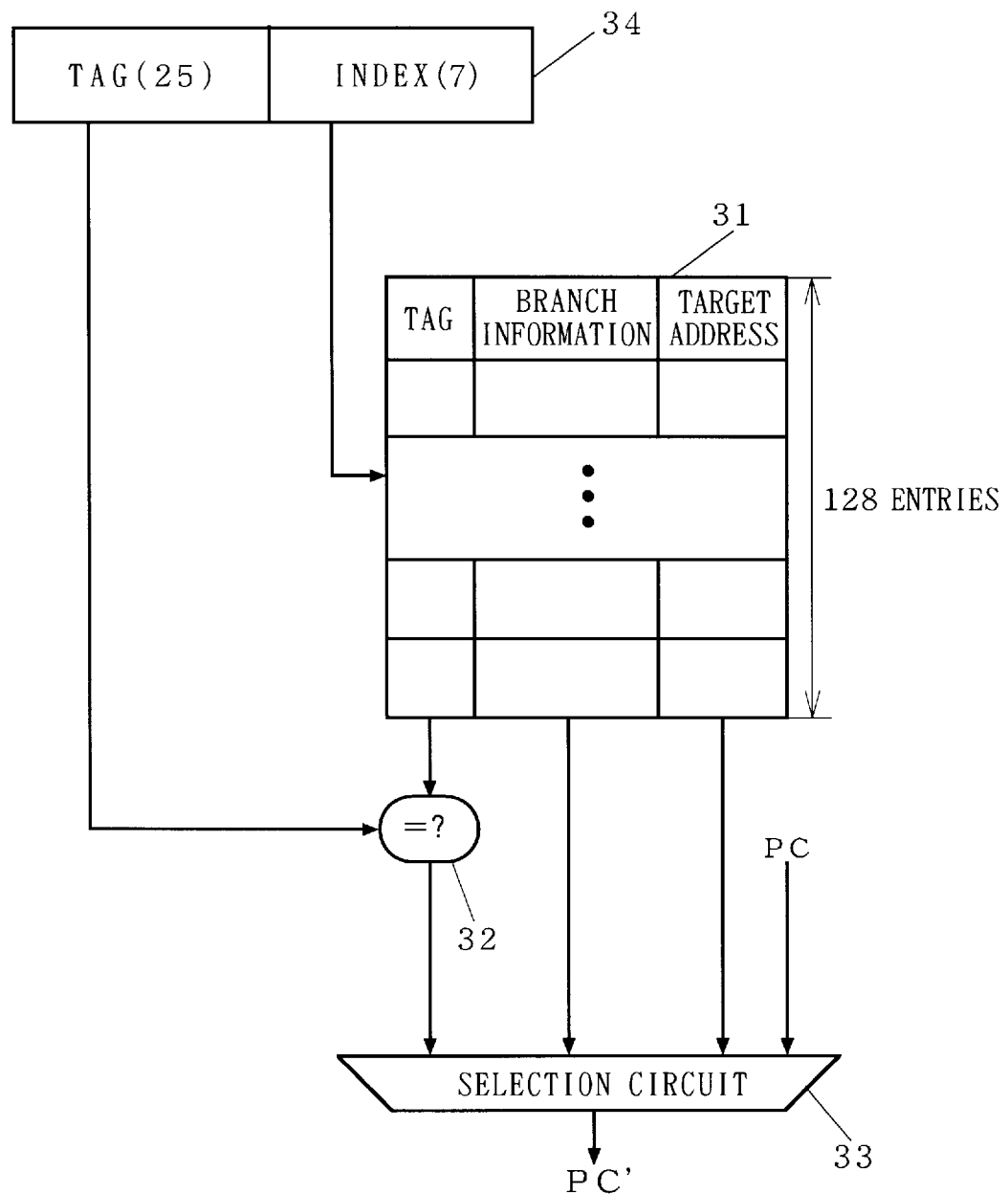
FIG. 7 illustrates a configuration of a branch prediction mechanism in the background art.
Figure 8:
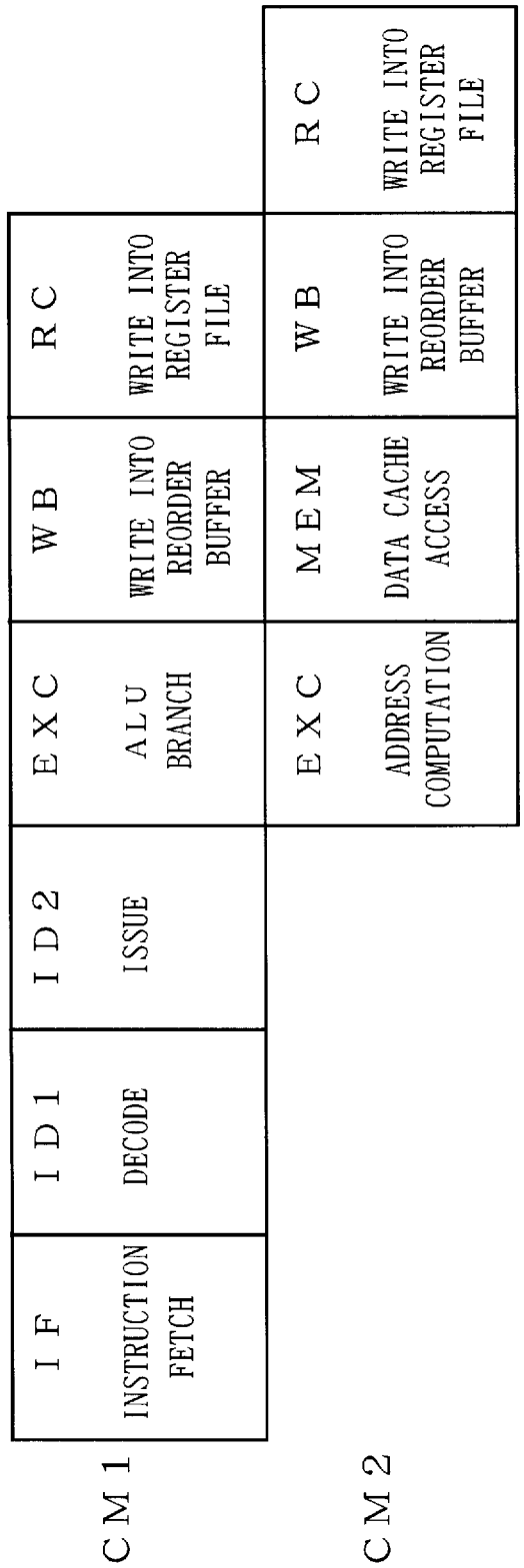
FIG. 8 illustrates a pipeline processing discussed to point out problems of the background art.

FIG. 6 illustrates an exemplary configuration of BTBs in a branch prediction mechanism for superscalar processor in accordance with the second preferred embodiment of the present invention.

In the branch prediction mechanism of the second preferred embodiment, an access is made to the BTB using an address with the lower 2 bits masked, like the first preferred embodiment.

A 32-bit executable instruction address is fetched into the address fetch unit 1. The address fetch unit 1 stores the upper 24 bits of the address as tag, the center 6 bits as index and the lower 2 bits as offset. Accordingly, an address represented by (tag+index) serves as the address of the cache block.

The first BTB 14 is predetermined for storing branch prediction informations on branch instructions of which the offset has an upper bit (the first partial offset) of "0", that is, the offset is 0("00") and 1("01"). The second BTB 24 is predetermined for storing branch prediction informations on branch instructions of which the first partial offset is "1", that is, the offset is 2("10") and 3("11").

Thus, the first and second BTBs 14 and 24 are determined for storing branch prediction informations on branch instructions having addresses which are classified according to a prescribed classification rule based on the value of the first partial offset.

Each entry of the BTB 14 stores the first branch prediction information consisting of tag, branch information (BI), target address (BTA) and the second partial offset (the lower bit of the offset). Similarly, each entry of the BTB 24 stores the second branch prediction information consisting of tag, branch information (BI), target address (BTA) and the second partial offset (the lower bit of the offset). The tag field stores the upper 24 bits of the address of the cache block which are not included in the index.

A tag detection circuit 15 performs a comparison between the tag of the first retrieval branch prediction information read out from the retrieval entry of the BTB 14 and the tag of the address fetch unit 1 and outputs the tag detection signals eq1 indicating whether the first retrieval branch prediction information is valid or invalid on the basis of whether or not the result of comparison is coincidence to the selection circuit 5. Similarly, a tag detection circuit 25 performs a comparison between the tag of the second retrieval branch prediction information read out from the retrieval entry of the BTB 24 and the tag of the address fetch unit 1 and outputs the tag detection signals eq2 indicating whether the second retrieval branch prediction information is valid or invalid on the basis of whether or not the result of comparison is coincidence to the selection circuit 5.

A PC detection circuit 16 outputs the PC detection signal lt1 on the basis of the second partial offset of11 of the first retrieval branch prediction information read out from the BTB 14 and the lower 2-bit value pc2 of the program counter value PC to the selection circuit 5. Specifically, the PC detection circuit 16 outputs the PC detection signal lt1 indicating that the information is valid when the upper bit b1 of the lower 2-bit value pc2 is "0" and of1≧b0 (the lower bit of the lower 2-bit value pc2) and otherwise outputs the PC detection signal lt1 indicating that the information is invalid.

A PC detection circuit 26 outputs the PC detection signal lt2 on the basis of the second partial offset of12 of the second retrieval branch prediction information read out from the BTB 24 and the lower 2-bit value pc2 of the program counter value PC to the selection circuit 5. Specifically, the PC detection circuit 26 outputs the PC detection signal lt2 indicating that the information is valid when the upper bit b1 of the lower 2-bit value pc2 is "0" or the upper bit b1 is "1" and of12≧b0 and otherwise outputs the PC detection signal lt2 indicating that the information is invalid.

Receiving the tag detection signals eq1 and eq2, the PC detection signals lt1 and lt2, the program counter value PC, the offsets of1 and of2, and the branch informations and the target addresses of the first and second retrieval branch prediction informations, the selection circuit 5 determines the next program counter value PC' and outputs it in the following manner. When any of the first and second retrieval branch prediction informations is indicated to be valid by the corresponding tag detection signal eq1 (or eq2) and PC detection signal lt1 (or lt2) and the branch information of that valid retrieval branch prediction information indicates that the branch is taken, the selection circuit 5 outputs the target address as the next program counter value PC' or otherwise outputs the sequential address obtained by incrementing the program counter value PC as the next program counter value PC' according to the logic of Table 3. Further, when the branch is predicted "taken", the selection circuit 5 outputs the offset of the address of the branch instruction separately. This offset is used for entry to the list of the branch prediction result storage 4 as shown in FIG. 5.

TABLE 3

| BRANCH IN BTB 11 TAKEN/NOT-TAKEN | BRANCH IN BTB 21 TAKEN/NOT-TAKEN | PC' (NEXT PC) |
| --- | --- | --- |
| ◯ | ◯ | TARGET ADDRESS IN BTB 14 |
| ◯ | X | TARGET ADDRESS IN BTB 14 |
| X | ◯ | TARGET ADDRESS IN BTB 24 |
| X | X | SEQUENTIAL ADDRESS |

In Table 3, "taken"(◯) on the column of the first BTB 14 is found when both the tag detection signal eq1 and the PC detection signal lt1 indicate that the information is valid and the branch information of the first retrieval branch prediction information indicates "taken" branch and otherwise "not-taken"(X) is found. Similarly, "taken"(◯) on the column of the second BTB 24 is found when both the tag detection signal eq2 and the PC detection signal lt2 indicate that the information is valid and the branch information of the second retrieval branch prediction information indicates "taken" branch and otherwise "not-taken"(X) is found.

As can been seen from the first row of Table 3, the selection circuit 5 outputs the target address of the first retrieval branch prediction information as the next program counter value PC' when "taken" is found in both the columns of the first and second BTBs 14 and 24. In other words, the first retrieval branch prediction information has priority over the second retrieval branch prediction information.

The reason is as follows. Since the BTBs 14 and 24 are determined for storing branch instructions having addresses which are classified according to the predetermined classification rule, the branch instruction associated with the first retrieval branch prediction information (of which the first partial offset is always "0") have such addresses as to be executed necessarily ahead of that associated with the second retrieval branch prediction information (of which the first partial offset is always "1") if these instructions have the same tag.

As can been seen from the second and third rows of Table 3, the selection circuit 5 outputs the target address of the first retrieval branch prediction information in the first BTB 14 as the next program counter value PC' when "taken" is found only in the column of the first BTB 14 and outputs the target address of the second retrieval branch prediction information in the second BTB 24 as the next program counter value PC' when "taken" is found only in the column of the second BTB 24.

As can been seen from the last row of Table 3, the selection circuit 5 outputs the sequential address obtained by incrementing the program counter value PC as the next program counter value PC' when both the branches in the first and second BTBs 14 and 24 are predicted "not-taken".

The branch prediction mechanism of the second preferred embodiment operates like the branch prediction mechanism of the first preferred embodiment, except that the BTBs 14 and 24 each store the second partial offset which is part of the offset, instead of the offset itself, and that the PC detection signals lt1 and lt2 are outputted from the PC detection circuits 16 and 26 according to the output logic different from that of the first preferred embodiment.

Effect

As discussed above, the branch prediction mechanism of the second preferred embodiment includes two BTBs 14 and 24 of which the entries can be accessed by the index of the executable instruction address fetched in the address fetch unit 1. The BTBs 14 and 24 are determined for storing branch instructions having addresses which are classified according to the classification rule based on the value of first partial offset ("0", "1"), and each entry of the BTBs 14 and 24 stores the second partial offset. That enables branch prediction only by fetching the executable instruction address into the address fetch unit 1, without decoding.

Therefore, in the branch prediction mechanism of the second preferred embodiment, no penalty is caused only if the prediction is correct when the branch is taken. Moreover, a plurality of BTBs 14 and 24 are provided for an index of an executable instruction address in the address fetch unit 1, which are allowed to have the same tag, to perform the respective branch predictions of two branch instructions if found in the cache block without delay. As a result, the branch prediction mechanism of the second preferred embodiment attains remarkable reduction in the number of branch penalties.

Furthermore, the configuration of the second preferred embodiment is achieved with relatively little increase of circuits: the second partial offset field in the BTB, another BTB and the PC detection circuits 16 and 26. That does not cause a rise in cost.

The selection circuit 5 takes the PC detection signals lt1 and lt2 which are the results of comparison between the lower 2-bit value pc2 of the current PC program counter PC and the respective second partial offsets of the first and second retrieval branch prediction informations into consideration to determine the next PC program counter value PC. That allows invalidation of any retrieval branch prediction information on inexecutable branch instruction, resulting in higher accuracy of branch prediction.

Further, even when both the first and second retrieval branch prediction informations are judged to be valid by the selection circuit 5, the selection circuit 5 gives priority to the target address corresponding to the branch information indicating "taken" branch to be used as the next program counter value PC' on the basis of the branch informations of the first and second retrieval branch prediction informations according to the logic of Table 3. That ensures further improvement in accuracy of branch prediction.

Furthermore, when both the first and second retrieval branch prediction informations are judged to be valid and both the branch informations thereof indicate "taken" branch by the selection circuit 5, the selection circuit 5 gives priority to the target address of the branch instruction which will be executed ahead to be used as the next program counter value PC' on the comparison between the respective offsets of the first and second retrieval branch prediction informations according to the logic of Table 3. That ensures still further improvement in accuracy of branch prediction.

While the invention has been shown and described in detail, the foregoing description is in all aspects illustrative and not restrictive. It is therefore understood that numerous modifications and variations can be devised without departing from the scope of the invention.

We claim:

1. A branch prediction mechanism for superscalar processor used in a superscalar processor capable of concurrently fetching a plurality of instructions into an instruction cache, addresses of said plurality of instructions each consisting of tag, index and offset, said plurality of instructions having the same tag and index, said offset indicating a location at which each of said plurality of instructions is stored in said instruction cache, comprising:

instruction address storage means for storing an executable instruction address which includes at least said tag and said index of a program counter value which is an address of a current executable instruction;

first to k-th ($k \geq 2$) target buffers each for storing a plurality of branch prediction informations, said plurality of branch prediction informations each including said tag of an address of a branch instruction and an offset corresponding part which corresponds to at least part of said offset of said address, branch information indicating prediction as to whether a branch in execution of said branch instruction is taken or not taken and a target address if said branch information predicts "taken" branch, said first to k-th target buffers outputting first to k-th retrieval branch prediction informations retrieved from said plurality of branch prediction informations on the basis of said index of said executable instruction address, and program counter value output means for judging whether each of said first to k-th retrieval branch prediction informations is valid or invalid according to whether or not said tag of said executable instruction address and that of each of said first to k-th retrieval branch prediction informations coincide and determining a next program counter value to be outputted, which is an address of a branch to be subsequently executed on the basis of one of said first to k-th retrieval branch prediction informations which is judged to be valid.

2. The branch prediction mechanism for superscalar processor of claim 1, wherein said offset corresponding part is said offset itself, and said program counter value output means takes a result of comparison between said offset of a current program counter value and each of said offsets of said first to k-th retrieval branch prediction informations into consideration to judge whether each of said plurality of branch prediction informations is valid or invalid.

3. The branch prediction mechanism for superscalar processor of claim 2, wherein when at least two of said first to k-th retrieval branch prediction informations are judged to be valid by said program counter value output means, said program counter value output means determines said next program counter value on the basis of each of said branch informations of said at least two of said first to k-th retrieval branch prediction informations.

4. The branch prediction mechanism for superscalar processor of claim 3, wherein when at least two of said first to k-th retrieval branch prediction informations are judged to be valid by said program counter value output means, said program counter value output means further takes a result of comparison between said offsets of said at least two of said first to k-th retrieval branch prediction informations into consideration to determine said next program counter value.

5. The branch prediction mechanism for superscalar processor of claim 1, wherein said offset consists of first and second partial offsets, said first to k-th target buffers are determined for each storing branch instructions having addresses which are classified according to a predetermined classification rule based on a value of said first partial offset, said offset corresponding part is said second partial offset, and said program counter value output means further takes a result of comparison between said offset of a current program counter value and each of said second partial offsets of said first to k-th retrieval branch prediction informations and said classification rule into consideration to judge whether each of said plurality of branch prediction informations is valid or invalid.

6. The branch prediction mechanism for superscalar processor of claim 5, wherein when at least two of said first to k-th retrieval branch prediction informations are judged to be valid by said program counter value output means, said program counter value output means determines said next program counter value on the basis of each of said branch informations of said at least two of said first to k-th retrieval branch prediction informations.

7. The branch prediction mechanism for superscalar processor of claim 6, wherein the order of precedence of said first to k-th retrieval branch prediction informations is predetermined according to said classification rule, and said program counter value output means further takes said order of precedence into consideration to determine said next program counter value when at least two of said first to k-th retrieval branch prediction informations are judged to be valid by said program counter value output means.

\* \* \* \* \*